United States Patent [19]

Berkowitz

[11] 4,027,987
[45] June 7, 1977

[54] JOINING DEVICE FOR CONNECTING TUBES

[75] Inventor: Irving L. Berkowitz, Binghamton, N.Y.

[73] Assignee: Kason Hardware Corporation, Binghamton, N.Y.

[22] Filed: Dec. 2, 1975

[21] Appl. No.: 636,847

Related U.S. Application Data

[63] Continuation-in-part of Ser. No. 368,453, June 8, 1973, Pat. No. 3,958,889.

[52] U.S. Cl. .............................. 403/172; 403/295
[51] Int. Cl.² ........................................ F16B 7/00
[58] Field of Search .......... 403/295, 171, 297, 172, 403/176, 292, 289, 170

[56] References Cited

UNITED STATES PATENTS

| | | | |
|---|---|---|---|
| 3,218,097 | 11/1965 | Bowers et al. ..................... | 403/295 |
| 3,711,133 | 1/1973 | Werner .............................. | 403/172 |
| 3,726,551 | 4/1973 | Levenberg ......................... | 403/172 |
| 3,743,332 | 7/1973 | Sonolet ............................ | 403/295 X |
| 3,829,226 | 8/1974 | Kreusel ............................ | 403/297 X |
| 3,854,831 | 12/1974 | Gutner ............................. | 403/297 X |

*Primary Examiner*—Andrew V. Kundrat
*Attorney, Agent, or Firm*—Paul J. Sutton

[57] ABSTRACT

The present invention discloses an inexpensive and efficient joining device for use in connecting a plurality of tubular members. A base portion is provided from which a plurality of tubular branch portions extend. The tubular branch portions are formed integrally with respect to the base portion such as by a casting method and are adapted to be inserted into the open ends of tubes. The branch portions each include integral, internal insert socket means. Pivotal locking means capable of being snapped into place and which are preferably molded from a suitable plastic material are carried by each branch portion in order to react with and hold a tube thereon.

10 Claims, 11 Drawing Figures

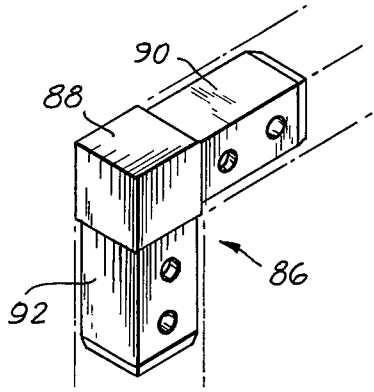
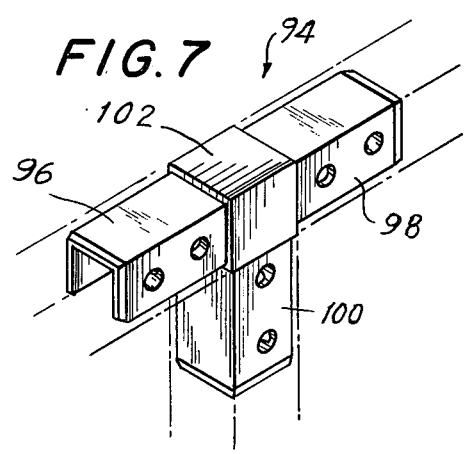
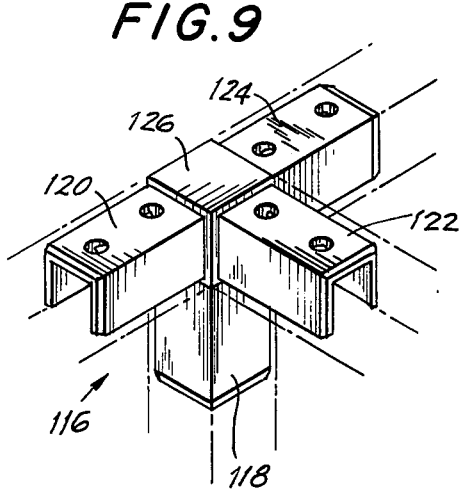
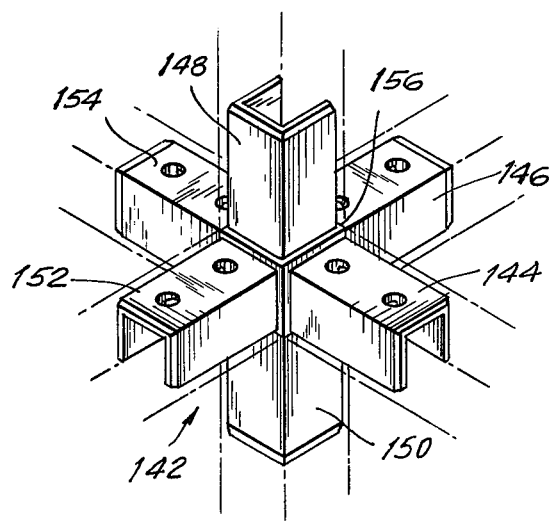

JOINING DEVICE FOR CONNECTING TUBES

This application is a continuation-in-part application of my copending application, Ser. No. 368,453 filed June 8, 1973, now U.S. Pat. No. 3,958,889.

The present invention relates generally to tube joining elements and more particularly to a connector for joining two or more tubes at a joint or junction, such as may be used in display fixtures, furniture, shelving, and the like.

There are several examples of prior art joint connector means in the general field to which the present invention is directed. One such example is disclosed in U.S. Pat. No. 3,743,332 granted on July 3, 1973 to H. C. Sonolet. In the Sonolet patent, a joining element having a body that is adapted for axial insertion into tube means is disclosed. The body has contact means for bearing against a first inner surface portion of the tube means and an arm member pivotally mounted thereon with two ends spaced along the axis of the body on either side of the pivoting point for engaging a second inner surface of the tube means transversely opposite with respect to said first surface portion. The two ends of the arm member are insertable in succession into the tube means with the first end being inserted freely while the second end is inserted forceably. The second end of the arm member tightly engages a second surface portion and produces lever action through the arm member to tightly engage the first end with the second surface portion in order to force the contact means against the first surface portion.

The ends of the arm member in the Sonolet patent are relatively thin and provide only minimum contact with the interior surface of the tube means. It will also be appreciated that, because the entire arm of Sonolet is relatively thin, it can be adversely affected by torsional forces that cause distortion thereof. Therefore there is a resultant minimum of holding power. In addition, in the Sonolet patent a separate pivot pin is required on which the arm is mounted. Thus, as in the case of the prior art, in the Sonolet patent there are undesirable assembly costs as well as the need to stock an inventory of a plurality of different parts.

Still another form of prior art is disclosed in my copending application, Ser. No. 368,453, filed June 8, 1973, which is now U.S. Pat. No. 3,958,889 and assigned to the assignee of this invention. In my copending patent there is disclosed a joining device for use in connecting a plurality of tubes. The joining device comprises a base portion having a plurality of branch portions integral with respect to and extending from the base portion. The branch portions are capable of being inserted into the tube. There is also provided locking means carried by each branch portion for holding each branch portion within the tube. The locking means in my copending patent comprises a body portion having a pair of axially spaced bearing surfaces which are pivotally supported for limited angular movement between first and second predetermined limit positions. The body portion includes first and second rearward surfaces each of which are adapted to independently engage an inner wall of the branch portion in order to define the extent of the limited angular movement. The bearing surfaces project from a transverse side of the branch portions and are insertable in succession together with the branch portion into a tube whereupon, during the insertion, a first one of the pair of bearing surfaces is substantially freely receivable by the tube and thereafter the second of the pair of bearing surfaces is forceably received by the tube due to a lever action that results from engagement of the first bearing surface with an internal surface of the tube.

While my copending patent represents an important contribution to the art, it has been found that certain elements such as roll pins can be eliminated in the subject joining device, which takes advantage of injection molded components and minimum assembly time. Of particular importance is the elimination of a separate roll-type pivot pin for the locking means and the labor requirements associated with its assembly. As a result of the present invention, the concepts disclosed in my copending patent find applicability in joining relatively small tubes, such as, for example, conventional one inch square tubes.

In its broadest aspect, the present invention provides a joining connector device for connecting itself to one or more tubes, as well as in connecting a plurality of tubes. The present invention includes a base portion, a plurality of tubular branch portions integral with and extending from the base portion and capable of being inserted into the tubes, each branch portion being formed with and including integral, internal socket means. There is also provided pivotable injection molded insert locking means carried by each branch portion for holding each branch portion within a tube. The insert locking means of the present invention each comprises a body portion having a pair of outwardly directly, axially spaced-apart bearing surface areas and an integral, transverse pin, the ends of which are positioned in the socket members for pivotally supporting the locking means for limited angular movement between first and second predetermined limit positions. The body portion of the locking means includes first and second rearwardly directed surfaces each of which is adapted to independently engage an internal surface of the connector branch portion in order to define the extent of the limited angular movement thereof. The spaced bearing surface areas project from a transverse side of the connector branch portion and are insertable in succession, together with the branch portion into a tube whereupon, during the insertion, the first bearing surface area is substantially freely receivable within the tube and thereafter the second bearing surface area is forceably received within the tube due to a lever action resulting from engagement of the first bearing surface with an internal surface of the tube.

According to the preferred embodiment of the present invention, the insert locking means body portion is disposed in one of the predetermined limit position only upon engagement of one of the rearwardly directed surfaces of the insert with the internal surface of the branch portion. Each branch portion includes a pair of laterally spaced-apart side walls and a connecting wall. The socket means comprise a U-shaped channel in each side wall with the open end of each channel facing in the direction away from the connecting wall. It is contemplated that the injection molded insert or locking means is simply snapped or slidably received in place in each connector branch portion, without the need for roll pins or other connecting apparatus.

The present invention further includes retaining means for preventing the removal of the locking means. One form of the retaining means comprises a pair of axially spaced-apart latch portions or members formed integrally with respect to the locking means and extending rearwardly, in a direction away from the bearing surfaces areas. A pair of cooperating, internal shoulders are formed integrally with the connector branch portions. The latch members are shaped so as to permit the insertion but not the removal thereof. Another form of retaining means comprises a plurality of deformable pads formed on the side walls of the connector branch portions with at least a portion of the pads being displaceable so as to engage and prevent the removal of the pivot pin that is integral with the insert locking means.

The present invention contemplates the elimination of most or all of the limitations and disadvantages found in the prior art by providing novel lock-on structure which exhibits strength and stability, and which enables its implementation by a single person. Accordingly, it is an object of the present invention to provide an improved joining device or joing connector for connecting tubes, in which there are a minimum of component parts and there is a minimum of labor required to assemble the finished device.

It is another object of the present invention to provide improved insert locking means for use with a joint connector for connecting tubes, and without the need for twisting, exotic tools, bolts or large assembly spaces.

A further object of the present invention is to provide improved pivot means for the insert locking means described hereinabove.

A further object of the present invention is to provide improved pivot means for the insert locking means described hereinabove.

A yet further object of the present invention is to provide means for retaining the insert locking means, as described above.

A still further object of the present invention is to provide a relatively inexpensive connecting device which is highly efficient and which is well-suited for relatively small-sized tubes.

The invention will be more clearly understood from the following description of specific embodiments of the invention, together with the accompanying drawings, wherein similar reference characters denote similar elements throughout the several views and in which:

FIG. 6 is a perspective view illustrating another elbow form of the present invention;

FIG. 7 is a perspective view illustrating still another tee form of the present invention;

FIG. 9 is a perspective view illustrating yet another tee with side outlet form of the present invention;

FIG. 11 is a perspective view illustrating yet another six-way cross form of the present invention.

Figure 1:
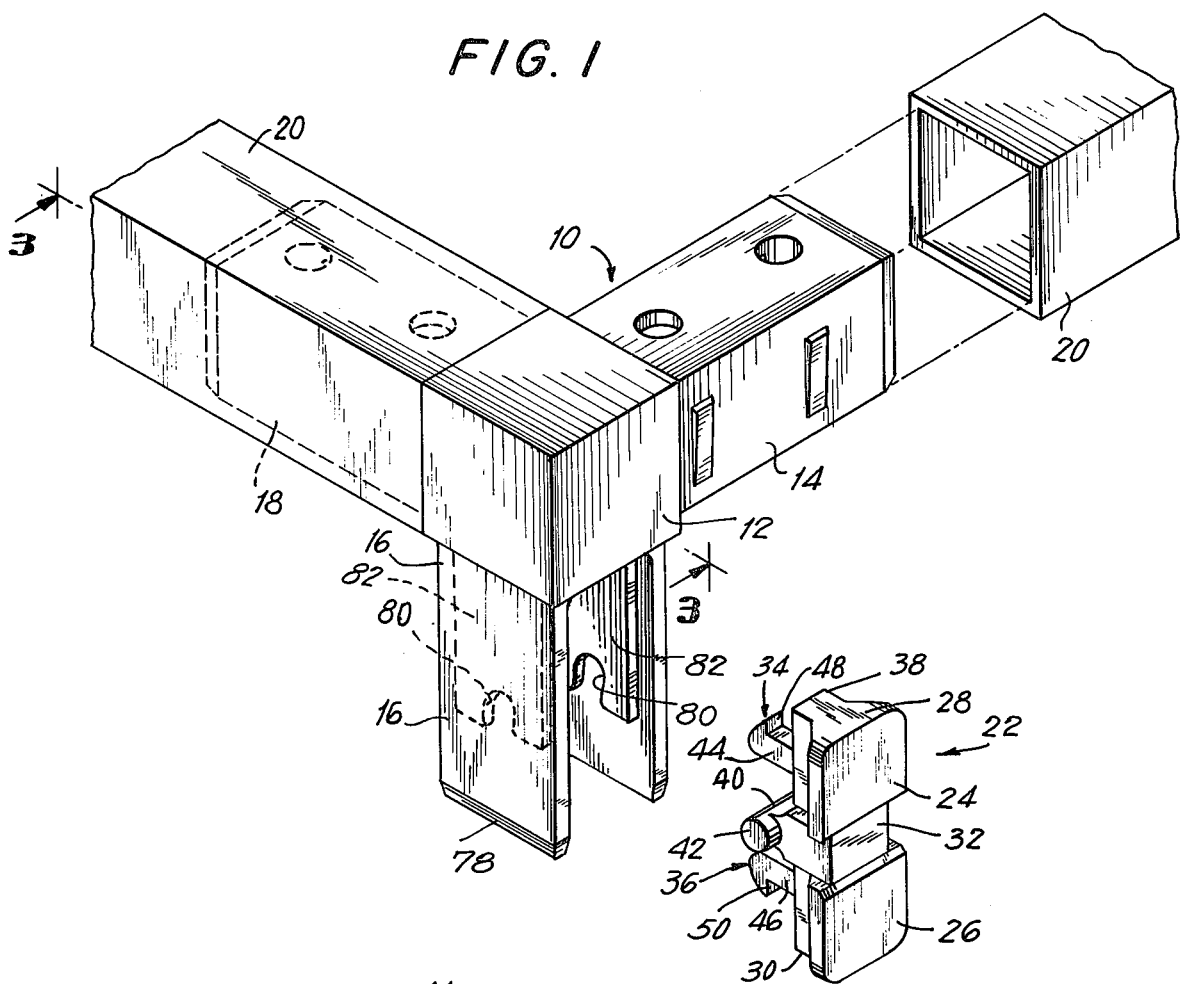
FIG. 1 is an exploded perspective view of one form of joining device or joint connector comprising the present invention.

Referring now in more detail to the drawings, FIG. 1 of the drawings illustrates in an exploded perspective-type view one form of the joining device or joint connector according to the present invention. A fitting or connector 10 is shown to be formed by a casting process so as to include a base portion or hub 12 of generally rectangular cross-section from which integral legs or branch portions 14, 16 and 18, respectively, extend. It is legs or branch portions 14, 16 and 18 which are adapted to enter and engage tubes 20 having open ends of a compatible interior cross-section. It should be noted that fitting or connector 10 may be used to join members that are not entirely hollow and which have sockets or ends of a predetermined and selected cross-section which are capable of receiving the legs or branch portions of the fitting.

Branch portions 14, 16 and 18 are preferably cast integrally with base portion 12 and extend along axes which are mutually perpendicular with respect to one another.

Each of branch portions 14, 16 and 18 carry an insert or insert locking means 22 which is of a shape capable of being molded by an injection molding process. Insert 22 is preferably formed of a plastic material and includes substantially planar surfaces 24 and 26 which are spaced from one another. Surfaces 24 and 26 join ends 28 and 30 of insert 22 and are integral with a central portion 32 disposed in a plane recessed from planar surfaces 24 and 26.

At a side of insert 22 transversely opposite with respect to surfaces 24 and 26, insert 22 is formed with outwardly extending projections 34 and 36, each of which is integral with and projects outwardly from a longitudinally extending rib 38. Also extending outwardly from rib 38 of insert locking means 22 is a transversely extending axle portion 40 having integral extremities or hubs 42. Hubs 42 are generally circular in cross-section and are formed with outer surfaces having a relatively low coefficient of friction to facilitate and enable a rocking-type motion during use, as will be explained in more detail below.

Insert or insert locking means 22 is preferably formed of a nylon material, reinforced to the extent of 30 percent by glass or other reinforcing media. The use of nylon as a material of construction facilitates the provision of relatively slender projections 34 and 36, each of which extends along a shank portion 44 in the case of projection 34, and a shank portion 46 in the case of projection 36. Shank portions 44 and 46 terminate in rounded ends formed with bearing surfaces 48 and 50, respectively.

Turning now to the structural details of branch portions 14, 16 and 18, it should be emphasized here that the present invention contemplates any number of combinations of leg or branch portion configurations. Three legs or branch portions 14, 16 and 18 have been shown in FIG. 1 for purposes of describing the invention in the present specification. However, it should be understood by the reader that other leg configurations including, but not limited to, FIGS. 6-11, inclusive, come within the scope of this invention.

Figure 2:
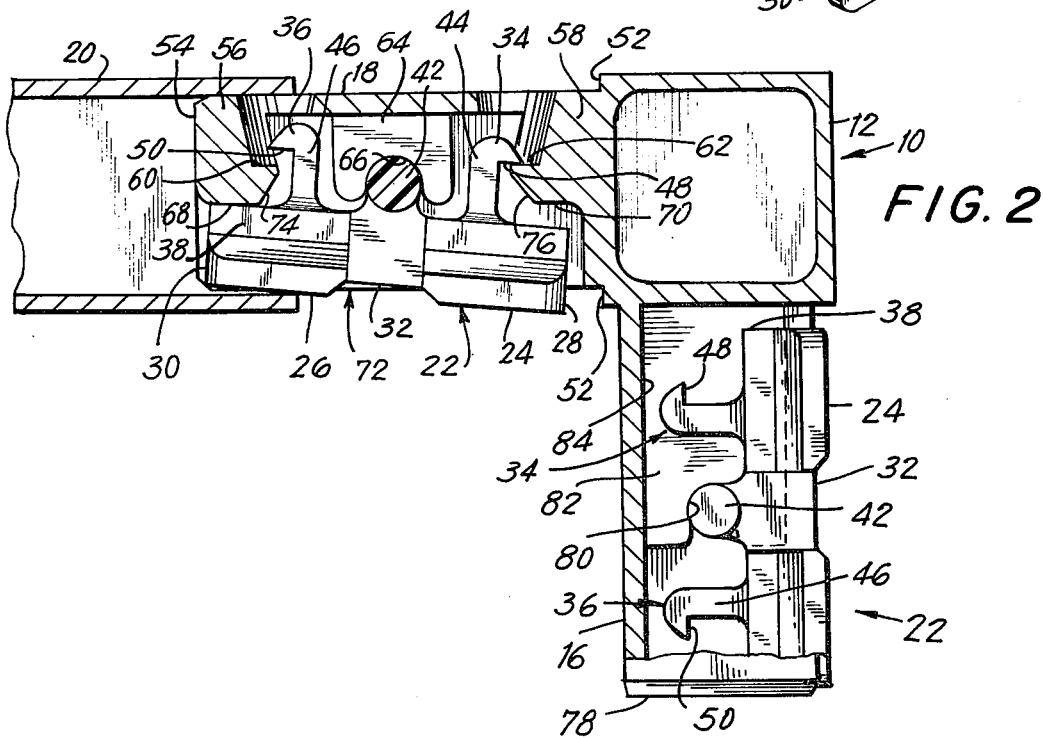
FIG. 2 is a fragmentary sectional view of the structure shown in FIG. 1 illustrating a tube partially joined therewith.

The structural details of legs or branch portions 14, 16 and 18 and, for that matter, the details of the other configurations illustrated and within the scope of this invention fall generally into two categories. The first category includes a structure wherein insert locking means 22 may be snapped forceably into an operative position in a direction transverse with respect to its longitudinal axis and the axis of the branch portion in which it is situated. The second category includes a structure wherein the insert locking means 22 is urged into position along its longitudinal axis and along the longitudinal axis of the branch portion within which it is situated. Branch portions 14 and 18 are of fitting or connector 10 represents examples of the first category, while branch portion 16, shown in FIGS. 1 and 2, represents an example of the second category.

The reason for the structural configurations represented by the two categories of legs or branch portions resides in the ease with which the casting of fitting or connector 10 may be accomplished. If the reader views connector 10 in the orientation shown in FIG. 1, he or she will appreciate that the fitting may be extracted from the mold (with or without inserts) in a direction which is vertical towards the top of sheet 1 of the drawings. If all legs or branch portions were formed in the manner of legs or branch portions 14 and 18, one could not remove the fitting or connector from the mold in the same manner.

Apart from orientation, branch portions 14 and 18 are substantially identical. Referring now to FIG. 2, branch portion 18 is shown to extend from hub 12 at shoulders 52 to end 54, which is chamfered. A pair of internal walls 56 and 58 define platform surfaces 60 and 62, respectively. Platform surfaces 60 and 62 are formed during the casting process in the manufacture of fitting or connector 10 and are preferably formed by the use of mold inserts (not shown), whose structural configurations and shapes conform substantially to the shapes of the surfaces of walls 56 and 58.

Substantially midlength of leg or branch portion 18, a pair of opposing bosses 64 define arcuate grooves 66 which are defined by arcuate surfaces. Internal walls 56 and 58 further define longitudinally extending surfaces 68 and 70 which are shown in FIG. 2 to be substantially parallel with respect to the planes of surfaces 60 and 62.

Insert 22 is shown in place within branch portion 18 in FIG. 2. Its insertion into the branch portion is made possible in a snap-in action through open side 72 of leg 18 via the provision of inclined surfaces 74 and 76 of interior walls 56 and 58. During insertion of insert 22, an initial interference between projections 34 and 36 and inclined surfaces 74 and 76 is overcome by urging the insert into branch portion 18, such that projections 34 and 36 bend without failure until they drop past platform surfaces 60 and 62 and hubs 42 come to rest in engagement against the surfaces defining grooves 66. Once in place, inserts 22 are not easily removed since there is a predetermined interference between bearing surfaces 48 and 50 and their opposing platform surfaces 60 and 62. In place, insert 22 is able to rock or pivot between extreme positions defined by predetermined interference between rib surfaces of rib 38 and surfaces 68 and 70. The assembly of locking inserts 22 within their respective branch portions corresponding to branch portion of leg 18 is simple, efficient and requires a minimum amount of time and skill, thereby providing the manufacturer with an improved design.

Branch portion 16 of FIG. 2 illustrates the type of branch portion or leg that has previously been referred to as comprising category 2 and its captive insert 22 is inserted through its open end 78 by simply sliding hubs 42 into an interference fit within grooves 80, which are defined by interior opposing bosses 82. In the case of inserts 22 positioned within branch portions or legs of the second category, such as leg 16, the limits of rocking or pivotal movement are predetermined and established by interference between the outermost extremities of projections 34 and 36 and interior wall surfaces 84 of the branch portion.

Figure 3:
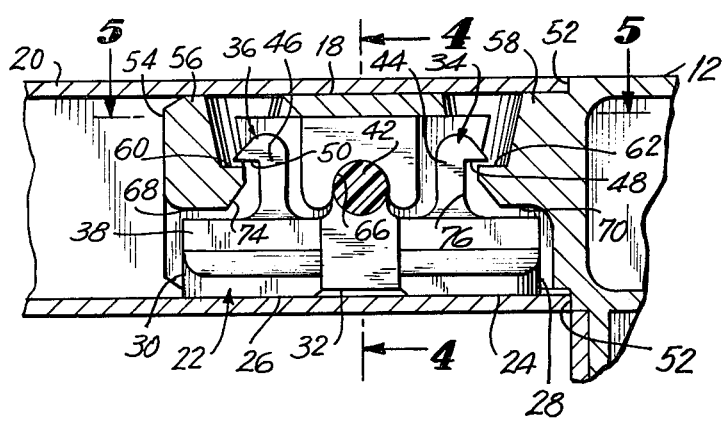
FIG. 3 is a fragmentary sectional view taken along line 3—3 of FIG. 1.
Figure 4:
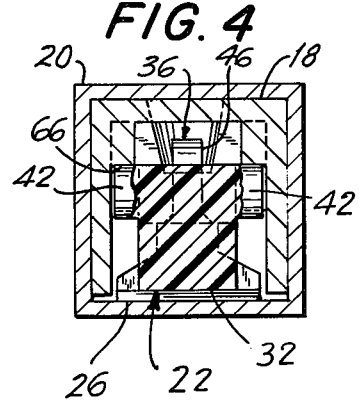
FIG. 4 is an elevational sectional view taken along line 4—4 of FIG. 3.
Figure 5:
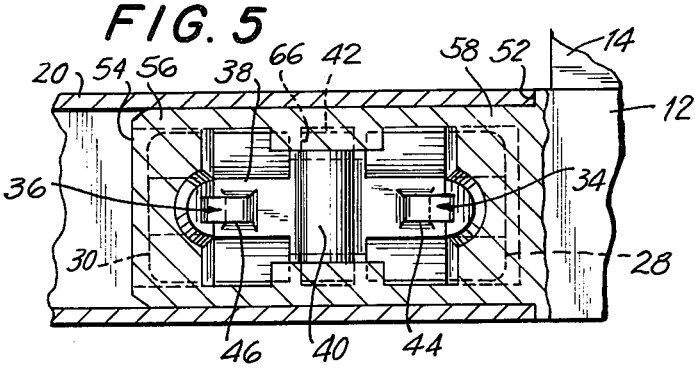
FIG. 5 is a fragmentary sectional view taken along line 5—5 of FIG. 3.

In use, regardless of the category of legs or branch portions, the method of mounting tubes 20 on or with fittings or connectors 10 is substantially the same. As best seen in FIG. 2, the tube is placed over the outermost extremities of leg 18 and the open end of the tube is freely received due to the rocking or pivoting of insert 22 and its planar surface 26 substantially out of the path of the tube. Upon further movement of the open end of tube 20 over leg 18, the tube will come into contact with planar surface 24, whereupon a lever-type action against surface 24 will cause an interfering pivoting of insert 22 about the axes of hubs 42 such that planar surface 26 will be caused to frictionally engage and come to bear against the inner walls of tube 20. As best seen in FIG. 3, upon continued urging of tube 20 over leg 18 until its ends come to rest against shoulders 52, planar surfaces 26 and 24 cause a gripping or locking action against the interior surfaces of tube 20 such that the tube is locked or held securely in place, and such that the entire structure made up of tubes 20 is a stable and secure one. Since it is contemplated that the present invention be used in the construction of various types of display stands and apparatus, this invention has been designed and will function such that the entire tubular structure will have structural integrity.

Though not ordinarily desirable, it is possible with the present invention to have access to projections 34 and 36 through the openings defined by interior walls 56 and 58 such that projections 44 and 46 may be urged toward one another until insert 22 may be removed. However, this is not ordinarily necessary or desirable.

The present invention incorporates a design whereby substantially identical inserts 22 may be used within all legs or branch portions of the fitting or connector in consideration. Also, while FIG. 1 illustrates a fitting or connector 10 comprising an elbow with a side outlet, other shapes are not only contemplated but provided. Reference to FIG. 6, for example, will illustrate a connector 86 in the shape of an elbow and comprising a base portion 88 integral with legs or branch portions 90 and 92. Branch portions 90 and 92 are substantially identical with branch portions 14 and 18 described above, and each accepts a locking insert 22.

Referring now to FIG. 7, a connector 94 is shown in the form of a tee in which three legs or branch portions 96, 98 and 100 are integrally formed with and extend from base portion or hub 102. As in the case of the aforementioned connectors, connector 94 and all of those discussed below include branch portions which accept locking inserts 22, which function in an identical manner in each case.

Figure 8:
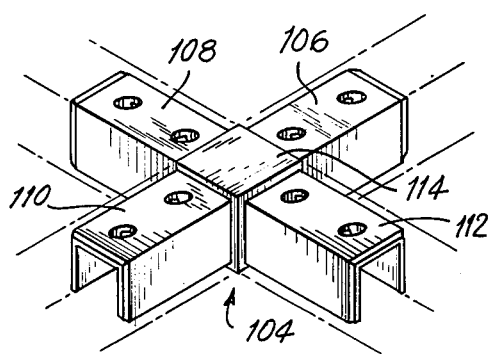
FIG. 8 is a perspective view illustrating an additional cross form of the present invention.

Referring now to FIG. 8, a connector or fitting 104 is shown in the form of a cross-shaped configuration in which legs 106, 108, 110 and 112 are integrally formed with and extend outwardly from base portion or hub 114. In FIG. 9, a connector 116 is shown in the form of a tee with a side outlet and in which branch portions or legs 118, 120, 122 and 124 are integrally formed with and extend outwardly from base portion or hub 126.

Figure 10:
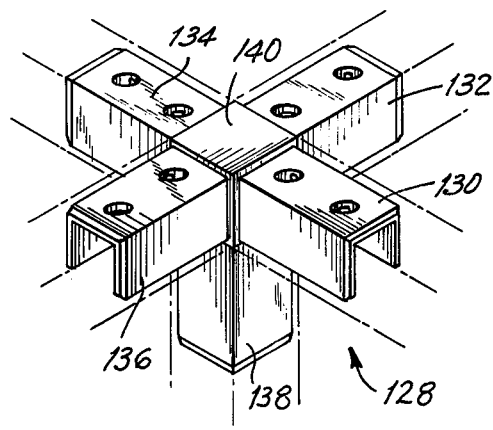
FIG. 10 is a perspective view illustrating a further cross with side outlet form of the present invention.

FIG. 10 illustrates yet another embodiment of the present invention wherein a connector 128 or fitting assumes the configuration of a cross with a side outlet and in which legs 130, 132, 134, 136 and 138 are integrally formed with and extend outwardly from base portion or hub 140. In FIG. 11, a connector 142 is shown in the configuration of a six-way cross which comprises legs 144, 146, 148, 150, 152 and 154, all of which are integrally formed with and extend outwardly from a base portion or hub 156. Yet other configurations and shapes are contemplated as coming within the scope of the present invention and while the embodiments illustrated in the present specification and drawings all include legs or branch portions which extend perpendicularly with respect to one another, it is contemplated that legs extending at other angles with respect to one another come within the scope of the present invention.

The embodiments of the invention particularly disclosed here are presented merely as examples of the invention. Other embodiments, forms and modifications of the invention coming within the proper scope of the appended claims will, of course, readily suggest themselves to those skilled in art.

What is claimed is:

1. A joining device for use in connection with one or more tubes, or the like, comprising: a base portion, at least one branch portion integral with and extending from said base portion and capable of insertion into said tubes, locking means carried by said branch portion for holding said branch portion within a tube, said locking means comprising a body portion having a pair of bearing surfaces and being pivotally supported at a position in said branch portion for limited angular movement between first and second predetermined limit positions, said locking means further including protruding retaining surfaces formed as spaced projecting portions integral with said body portion, said body portion including first and second rearward surfaces, each adapted to independently engage an inner wall of said branch portion, thereby defining the extent of said limited angular movement, said bearing surfaces projecting beyond a transverse side of said branch portion, said bearing surfaces being insertable in succession together with said branch portion into a tube whereupon during said insertion a first of said pair of bearing surfaces is substantially freely receivable by the tube and thereafter the second of said pair is only forceably receivable by said tube due to lever action resulting from engagement of said first bearing surface with internal surfaces of the tube, and means for movably securing said locking means to said branch portion said securing means comprising holding means integral with portions of said branch portion for contacting said protruding retaining surfaces, the cooperation of said holding means and said protruding retaining surfaces facilitating arcuate movement of said body portion with respect to said branch portion.

2. A joining device according to claim 1, wherein said body portion is disposed in one of said predetermined limit positions only upon engagement of one of said rearward surfaces with said inner branch portion wall.

3. A joining device according to claim 1, wherein said branch portion includes an opening through which said body portion projects.

4. A joining device according to claim 1, wherein said branch portion is substantially open at its outer extremity.

5. A joining device according to claim 1, wherein said base portion is formed with at least one external shoulder adapted to be abutted by a tube fitted onto said branch portion.

6. A joining device according to claim 1, wherein said base and branch portions comprise a one-piece member.

7. A joining device according to claim 1, wherein said securing means comprises a cooperative interconnection between projecting portions of said locking means body and portions of said branch portion.

8. A joining device according to claim 1, comprising a plurality of branch portions including spaced-apart side walls and a connecting wall integral therewith, each of said branch portions including groove means for receiving portions of said locking means.

9. A joining device according to claim 8, wherein said groove means comprises an arcuate channel.

10. A joining device according to claim 8, wherein said locking means comprises an insert capable of being formed by an injection molding process and including projecting hub portions cooperative with said groove means, said insert further including a pair of finger-like projections which are spaced from one another and which are each formed with surfaces adapted to engage internal surfaces of the branch portion within which it is situated, thereby limiting said angular movement.

* * * * *